US012440069B2

(12) United States Patent
Morabito et al.

(10) Patent No.: US 12,440,069 B2
(45) Date of Patent: Oct. 14, 2025

(54) LID FOR A FOOD PROCESSOR

(71) Applicant: Breville Pty Limited, Alexandria (AU)

(72) Inventors: Joshua Morabito, Alexandria (AU); Sebastien Tiburzio, Alexandria (AU); Mark Anthony Thomas, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 982 days.

(21) Appl. No.: 17/615,915

(22) PCT Filed: Jun. 3, 2020

(86) PCT No.: PCT/AU2020/050559
§ 371 (c)(1),
(2) Date: Dec. 2, 2021

(87) PCT Pub. No.: WO2020/243774
PCT Pub. Date: Dec. 10, 2020

(65) Prior Publication Data
US 2022/0315291 A1  Oct. 6, 2022

(30) Foreign Application Priority Data

Jun. 5, 2019 (AU) .................................. 2019901948

(51) Int. Cl.
*A47J 43/046* (2006.01)
*A47J 43/07* (2006.01)
*B65D 43/02* (2006.01)

(52) U.S. Cl.
CPC ......... *A47J 43/0727* (2013.01); *A47J 43/046* (2013.01); *B65D 43/0212* (2013.01)

(58) Field of Classification Search
CPC ...... A47J 43/046; A47J 43/07; A47J 43/0727; A47J 43/0705; B65D 43/0212; B65D 43/0204
(Continued)

(56) References Cited

U.S. PATENT DOCUMENTS 2,022,342 A * 11/1935 Drood ................... B65D 25/42
222/572
2,087,474 A * 7/1937 Green .................. B02C 18/305
241/285.2
(Continued)

FOREIGN PATENT DOCUMENTS

AU   2012292962 B2   12/2017
CN   104108529 A     10/2014
(Continued)

OTHER PUBLICATIONS

Russian Office Action dated Sep. 6, 2023 for Application No. 2021135463/03.
(Continued)

*Primary Examiner* — Reginald Alexander
(74) *Attorney, Agent, or Firm* — Patterson + Sheridan, LLP

(57) ABSTRACT

A lid (116) for a food processor, the food processor including a hollow body (102) providing an interior chamber (103) to receive product and within which the product is processed, the body (102) having a sidewall (112) with a rim portion (108) surrounding a body top opening (114), the rim portion (108) having a lip (109), the body (102) further including a spout (110) protruding from the side wall (112) adjacent the rim portion (108) and having a spout side opening (117), the lid (116) including: a main part (118) to cooperate with the lip (109) to close the body top opening (114); a top skirt (120) to extend into the interior (103) of the body (102) and sealingly interface with an inner surface of the sidewall
(Continued)

(112) and the rim portion (108); and a cover (200) moveably attached to the main part (118) and to cooperate with the spout (110) to close the spout side opening (117); and the cover (200) having a side skirt to extend into the spout (110) and sealingly interface with an inner (240) and outer (241) surface of the spout side opening (117).

18 Claims, 13 Drawing Sheets

(58) Field of Classification Search
USPC ........ 220/212, 254.3, 254.4; 222/475.1, 475, 222/571, 572, 573
See application file for complete search history.

(56) References Cited

U.S. PATENT DOCUMENTS

| | | | | |
|---|---|---|---|---|
| 3,081,010 | A * | 3/1963 | Tupper | B65D 47/0895 |
| | | | | 222/545 |
| 3,871,552 | A * | 3/1975 | Irland | B65D 17/4012 |
| | | | | 220/367.1 |
| 5,094,543 | A * | 3/1992 | Mursa | B01F 27/88 |
| | | | | 222/572 |
| 6,079,588 | A * | 6/2000 | Khafizov | B65D 43/24 |
| | | | | 220/717 |
| 2008/0156913 | A1 | 7/2008 | Orent | |
| 2012/0024993 | A1 | 2/2012 | Audette et al. | |
| 2016/0296899 | A1 | 10/2016 | Hoare et al. | |

FOREIGN PATENT DOCUMENTS

| | | |
|---|---|---|
| CN | 207940789 U | 10/2018 |
| EP | 1068894 A1 | 1/2001 |
| KR | 20150131182 A | 11/2015 |

OTHER PUBLICATIONS

International Search Report for International Application No. PCT/AU2020/050559 dated Aug. 13, 2020.
Chinese Office Action dated Oct. 20, 2023 for Application No. 2020800426722.
Extended European Search Report dated Jun. 1, 2023 for Application No. 20819470.4.

* cited by examiner

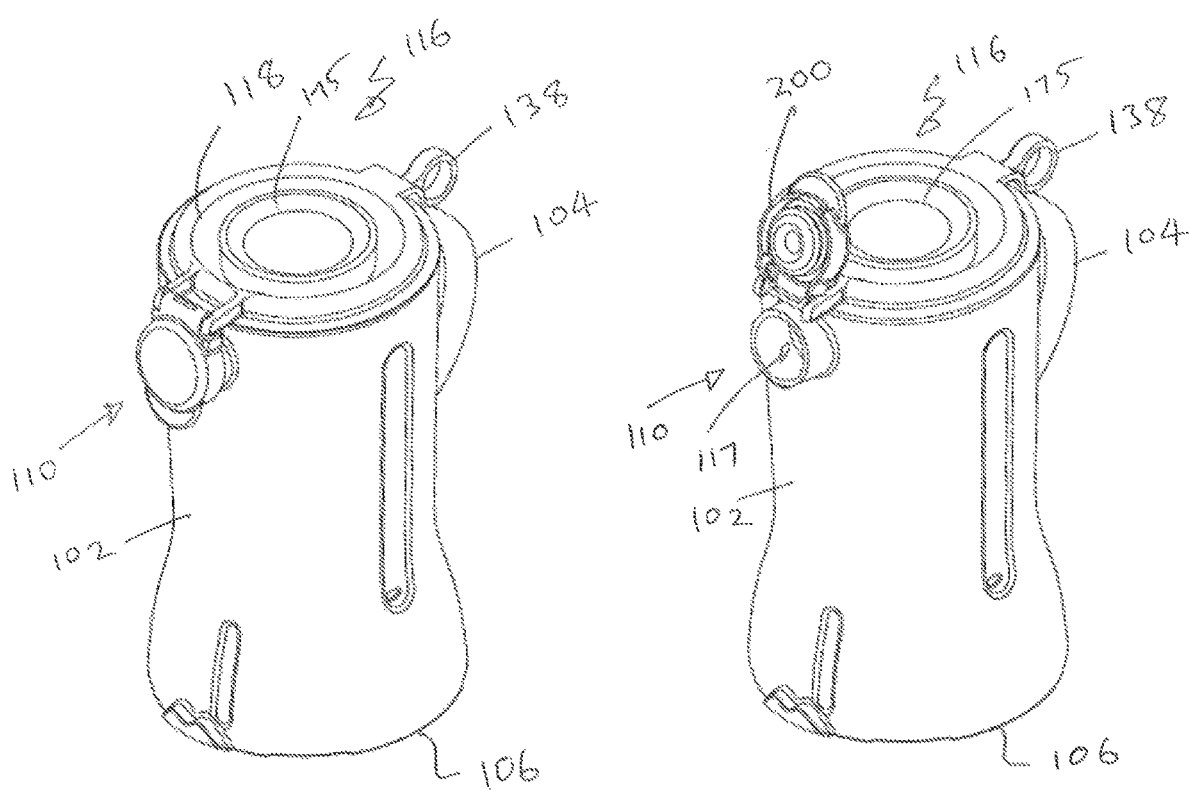

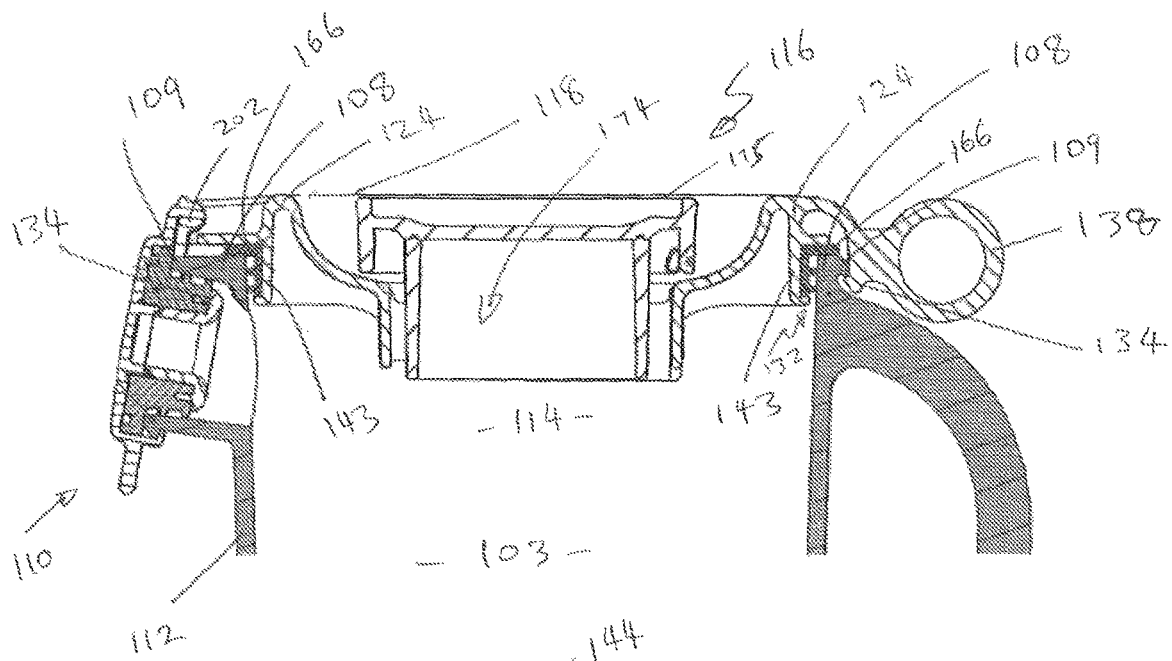
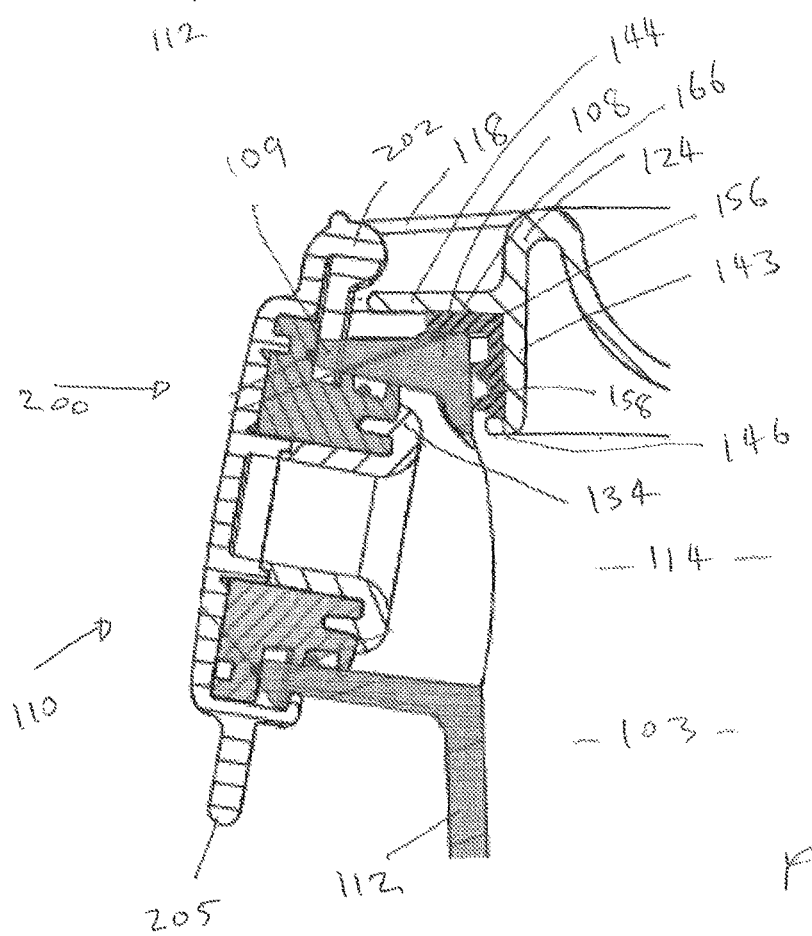
FIG 10
FIG 11

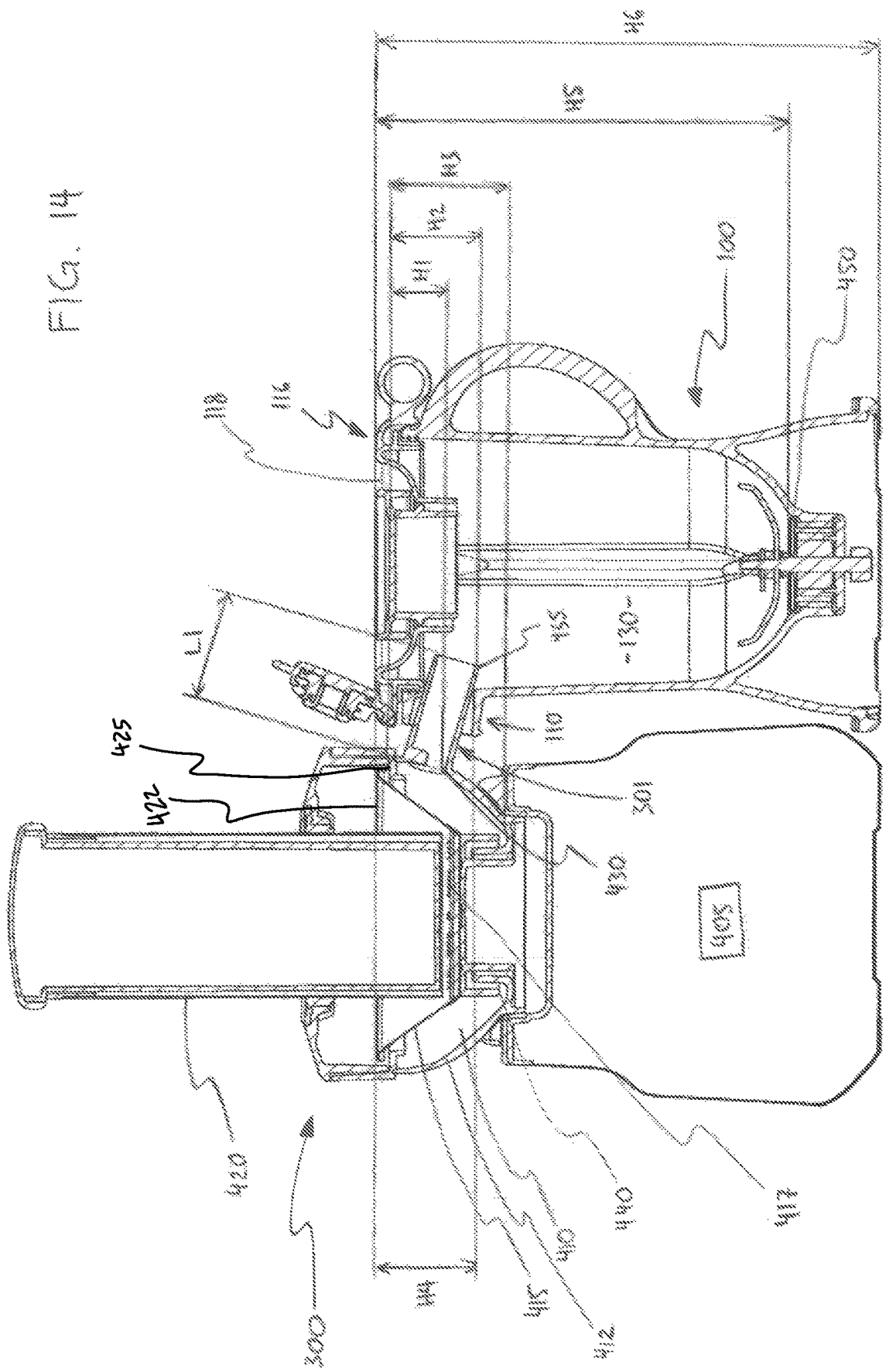

LID FOR A FOOD PROCESSOR

FIELD

The present invention relates to a lid for a container.

The invention has been developed primarily for use as a lid for a food processor such as a blender and/or a juicer and will be described hereinafter with reference to this application. However, it will be appreciated that the invention is not limited to this particular field of use.

BACKGROUND

A blender is used to mix, stir, liquefy, and otherwise process foods and beverages. A typical blender has a motorised base with rotating blades, and a removable vessel typically in the form of a jug having an interior, with the jug contents being isolated from the outside environment by a lid. The removable vessel is coupled to the motorised base, and the action of the rotating blades causes the contents of the vessel to circulate around the vessel.

Accordingly, the lid is typically designed to withstand the forces exerted by the rising and circulating contents to securely seal the vessel (jug). Disadvantageously, this results in a lid which is relatively difficult to remove readily, or which may not adequately seal the vessel when the interior is subjected to a "negative pressure". Air will naturally flow from areas with higher pressure to areas with lower pressure, such that when pressure inside the vessel is lower than the pressure outside the vessel, the air in the external environment naturally moves to the lower pressure area inside the vessel, thus causing the lid to be pulled down.

Existing lids are also not easily operable with other appliances to make use of of the blender vessel as a storage device, for example. Further, existing lids do not create sufficient vacuum sealing to properly preserve ingredients for long periods and to limit the oxidation process.

Blender and juicers are also typically provided as two separate kitchen appliances. A user would firstly operate a juicer to create a juice, then transfer the contents of the juicer vessel into another appliance, for example, a blender, to blend the contents and to incorporate other ingredients. Notwithstanding the mess that results from the transference, the manual actions required to pour or transfer the contents from one appliance to another can be time consuming and inefficient. Additionally, the use of multiple appliances is not space-efficient as it typically requires a large kitchen bench footprint.

SUMMARY

It is an object of the present invention to substantially overcome, or at least ameliorate, one or more of the disadvantages of existing arrangements, or at least provide a useful alternative to existing arrangements.

There is disclosed herein a lid for a food processor, the food processor including a hollow body providing an interior chamber to receive product and within which the product is processed, the body having a sidewall with a rim portion surrounding a body top opening, the rim portion having a lip, the body further including a spout protruding from the side wall adjacent the rim and having a spout side opening, the lid including:

a main part to cooperate with the lip to close the body top opening;

a top skirt to extend into the interior of the body and sealingly interface with an inner surface of the sidewall and the rim; and a cover moveably attached to the main part and to cooperate with the spout to close the spout side opening; and the cover having a side skirt to extend into the spout and sealingly interface with an inner and outer surface of the spout side opening.

Preferably, the main part includes a roof extending over the top skirt, the roof including at least one latch member spaced apart around a periphery of the roof to releasably couple to the lip of the rim portion.

Preferably, the latch member can flex independently of the roof.

Preferably, the cover includes a latch member to releasably couple to a lip of the spout side opening.

Preferably, the roof latch member and the cover latch member each include a projection to engage the lip to secure to the body.

Preferably, at least one of the latch members includes a pull tab.

Preferably, at least one of the latch members includes a clip.

Preferably, the latch members have a sealing projection to engage the rim portion so that the sealing projection deflects into the inner surface of the sidewall to seal the body when the interior is subjected to a negative pressure relative to outside the interior.

Preferably, the sealing projections overlap the rim portion to provide sealing engagement inside and outside the chamber.

Preferably, the sealing projections overlap an opening of the spout to provide sealing engagement inside and outside the spout side opening.

Preferably, the cover is pivotally connected to the main part.

Preferably, the cover includes a notch cooperatively associated with a flange on said main part to retain the cover in an open position.

Preferably, the main part includes a guide adapted to cooperate with a corresponding ridge on the body to provide alignment of the main part and body.

There is also disclosed herein in combination:

a container for a food processor, the container including a hollow body providing an interior chamber to receive product and within which the product is processed, the body having a sidewall with an outwardly stepped rim portion surrounding a body top opening, the rim portion having a lip; and a removable lid to close the container, the lid including:

a main part to cooperate with the lip to close the body top opening;

a top skirt to extend into the interior of the body and sealingly interface with an inner surface of the sidewall and the rim; and a cover moveably attached to the main part and to cooperate with the spout to close the spout side opening; and the cover having a side skirt to extend into the spout and sealingly interface with an inner and outer surface of the spout side opening.

There is also disclosed herein a lid for a food processor, the food processor including a hollow body providing an interior chamber to receive product and within which the product is processed, the body having a sidewall with a rim portion surrounding a body top opening, the rim portion having a lip, the body further including a spout protruding from the side wall adjacent the rim and having a spout side opening, the lid including:
  a main part to cooperate with the lip to close the body top opening;
  a top skirt to extend into the interior of the body and sealingly interface with an inner surface of the sidewall and the rim; and
  a cover moveably attached to the main part and to cooperate with the spout to close the spout side opening;
  the cover having a side skirt to extend into the spout and sealingly interface with an inner and outer surface of the spout side opening;
  the main part including a roof extending over the skirt; the roof having an aperture extending through said main part to provide access to said interior chamber; and a removable cap adapted for sealing engagement with said aperture to close access to said interior chamber.

There is also disclosed herein an assembly comprising a blender jug and a juicer apparatus,
  the juicer apparatus including:
    a motorised base;
    a juicer chamber having an exit tube; and
    a filter basket located within the juicer chamber and rotatable by an output shaft of the motorised base;
  the blender jug including:
    a hollow body surrounding an interior chamber to receive product and within which the product is processed;
    a spout extending from the hollow body and adapted to be connected to the exit tube of the juicer chamber in use, the spout being covered by a spout cover that is located on a lid of the blender jug; and
    wherein the body includes an upper rim portion surrounding a body top opening, whereby the upper rim portion is located proximate to the exit tube of the juicer chamber in use.

Preferably, the upper rim portion of the body is located proximate to an upper rim of the filter basket.

Preferably, the upper rim portion is generally level with the upper rim of the filter basket.

Preferably, the spout cover includes one or more sealing members to sealingly engage the spout and seal the interior chamber from an external environment surrounding the blender jug.

Preferably, the motorised base of the juicer apparatus is adapted to interchangeably receive the juicing apparatus and the blender jug for selective operation of the juicer apparatus and the blender jug.

Preferably, the assembly further includes the lid of the blender jug, and wherein: the body of the blender jug includes a sidewall, and the spout extends from the sidewall adjacent the upper rim portion, and wherein the upper rim portion includes a lip and the spout includes a spout side opening.

Preferably, the lid includes:
  a main part to cooperate with the lip to close the body top opening;
  a top skirt to extend into the interior of the body and sealingly interface with an inner surface of the sidewall and the upper rim portion;
  the spout cover that is moveably attached to the main part and to cooperate with the spout to close the spout side opening; and
    wherein the spout cover includes a side skirt to extend into the spout and sealingly interface with an inner and outer surface of the spout side opening.

Preferably, the main part includes a roof extending over the top skirt, the roof including at least one latch member spaced apart around a periphery of the roof to releasably couple to the lip of the upper rim portion.

Preferably, the latch member can flex independently of the roof.

Preferably, the spout cover includes a latch member to releasably couple to a lip of the spout side opening.

Preferably, the roof latch member and the cover latch member each include a projection to engage the lip to secure to the body.

Preferably, at least one of the latch members includes a pull tab.

Preferably, at least one of the latch members includes a clip.

Preferably, the latch members each have a sealing projection to engage the rim portion so that the sealing projection deflects into the inner surface of the sidewall to seal the body when the interior chamber is subjected to a negative pressure relative to outside the interior chamber.

Preferably, the sealing projections overlap the rim portion to provide sealing engagement inside and outside the interior chamber.

Preferably, the sealing projections overlap an opening of the spout to provide sealing engagement inside and outside the spout side opening.

Preferably, the cover is pivotally connected to the main part.

Preferably, the cover includes a notch or protrusion cooperatively associated with a flange on said main part to retain the cover in an open position.

Preferably, the main part includes a guide adapted to cooperate with a corresponding ridge on the body to provide alignment of the main part and body.

BRIEF DESCRIPTION OF THE DRAWINGS

Preferred embodiments of the present invention will be described by way of examples only, with reference to the accompanying drawings:

FIGS. 4a and 4b are perspective views of the blender jug, lid and lid cap of FIG. 3 with a spout lid in a closed configuration and an open configuration, respectively;

FIG. 10 is an enlarged sectioned view of the lid and the lid cap;

FIG. 11 is a further enlarged sectioned view of the spout assembly;

FIG. 14 is a sectioned side view of a full assembly including the blender jug and a juicer apparatus connected to the blender jug.

DETAILED DESCRIPTION OF EMBODIMENTS

Figure 2:
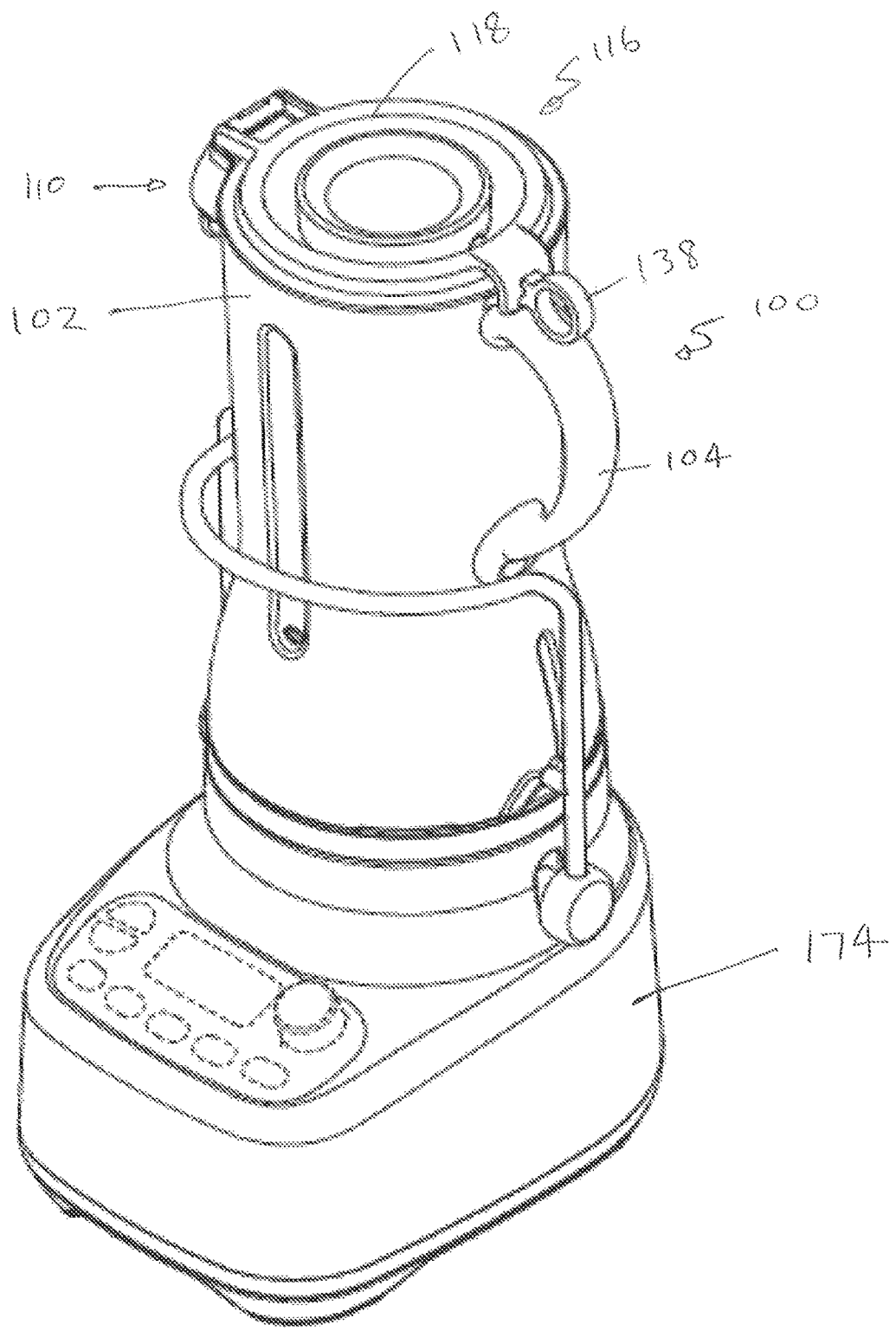
FIG. 2 is a perspective view of a blender jug, lid and a lid cap located on a blender power motor housing.

In the accompanying drawings, there is schematically depicted a container 100 within which food can be processed. As an example, the container 100 may be a container for a blender (see FIG. 2) or other food processing apparatus within which a food product is engaged and processed in some form by a blade assembly 172 (see FIG. 9). The blade assembly 172 has a blade 173 which may be rotatably driven by a drive assembly that includes a motor located within a drive motor power housing 174 (see FIG. 2).

Figure 3:
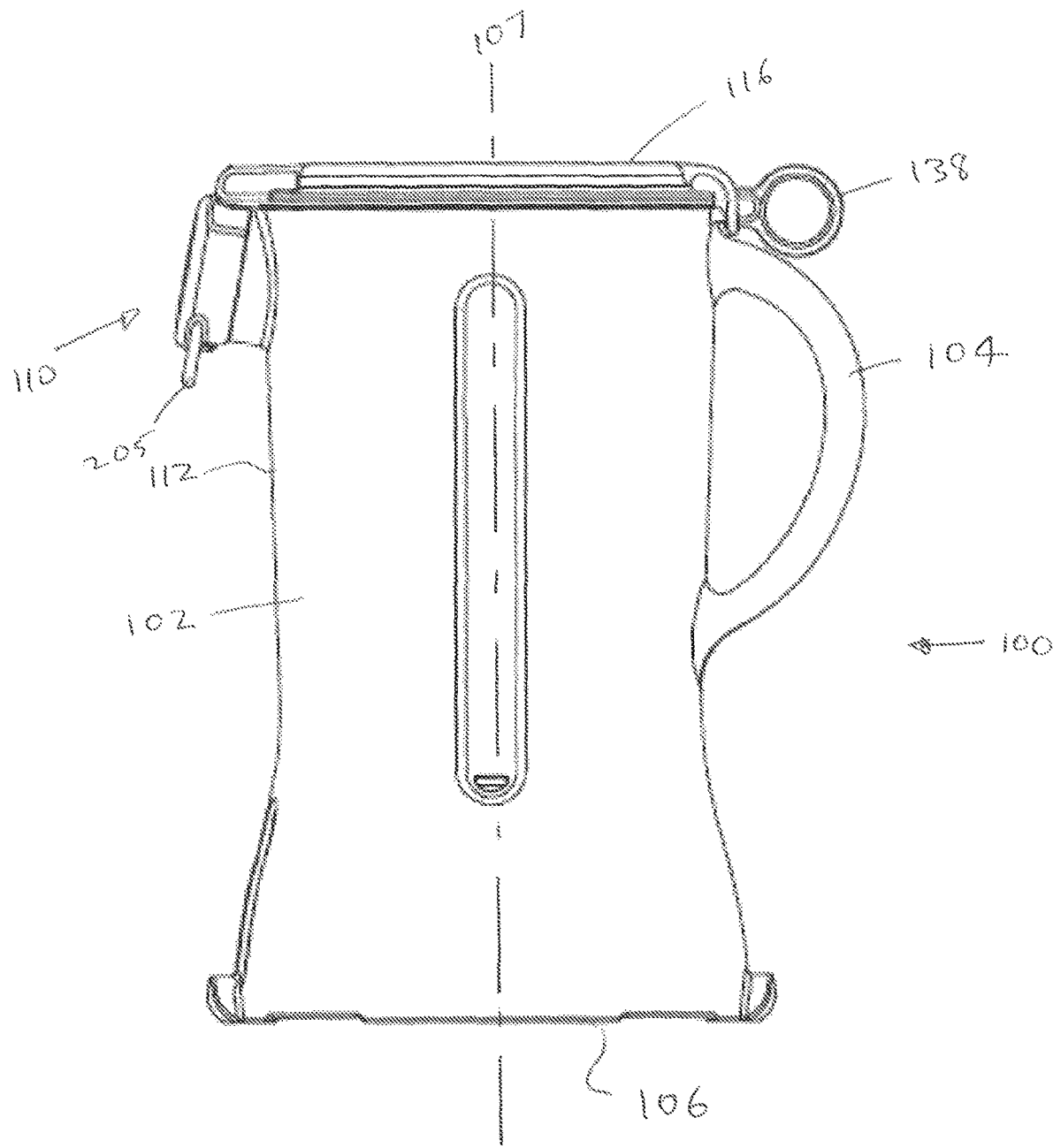
FIG. 3 is a side view of a blender jug, lid and a lid cap of an embodiment of the invention.

The container 100 includes a hollow vessel or body (jug) 102 having a handle 104 and a base 106 (see FIG. 3) that engages the drive assembly for the food processor (blender). The container (jug) 100 has a generally central longitudinal axis 107 (See FIG. 3).

Figure 1:
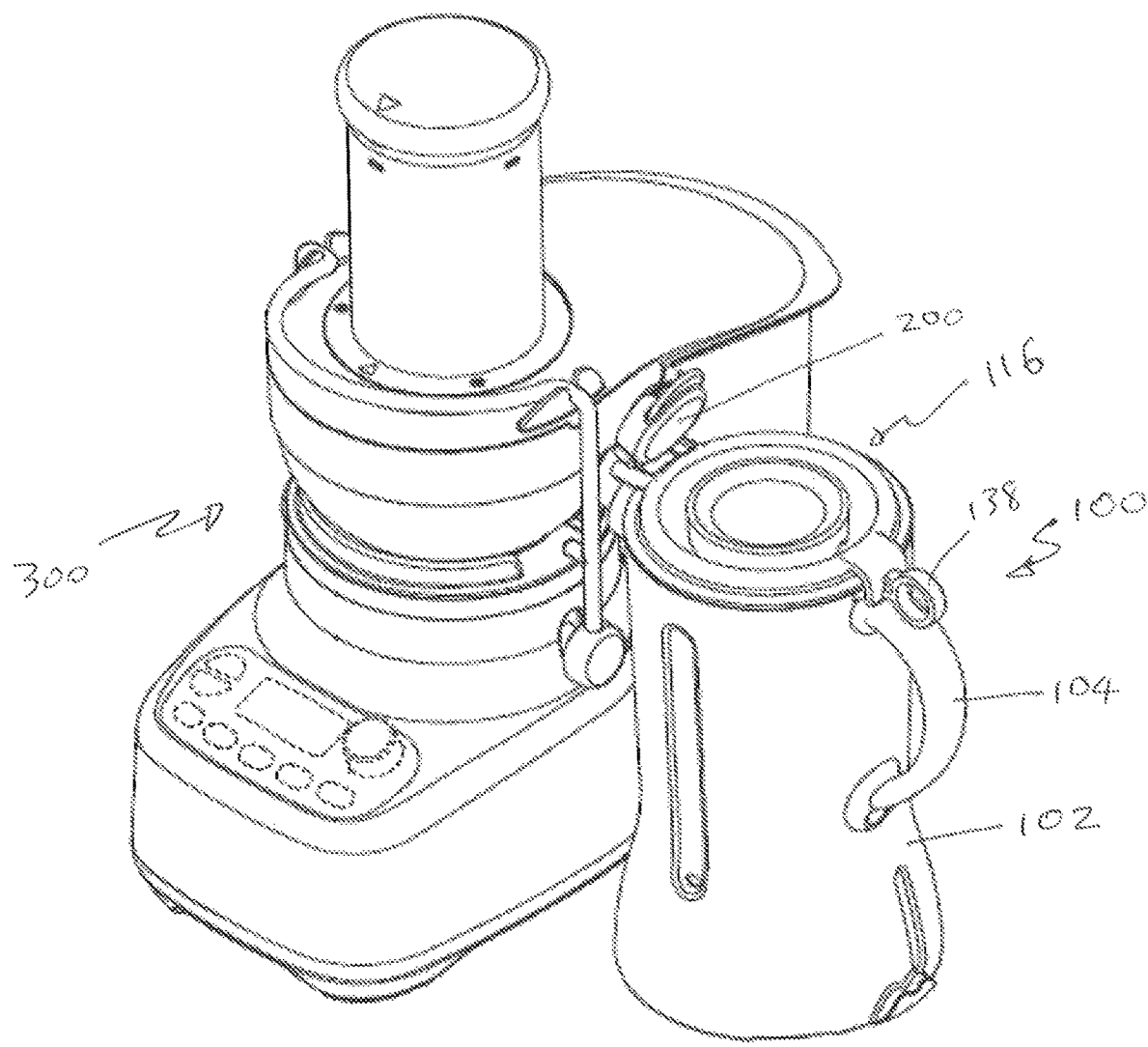
FIG. 1 is a perspective view of a blender jug, lid and a lid cap connected to a juicer.
Figures 5A, 5B:
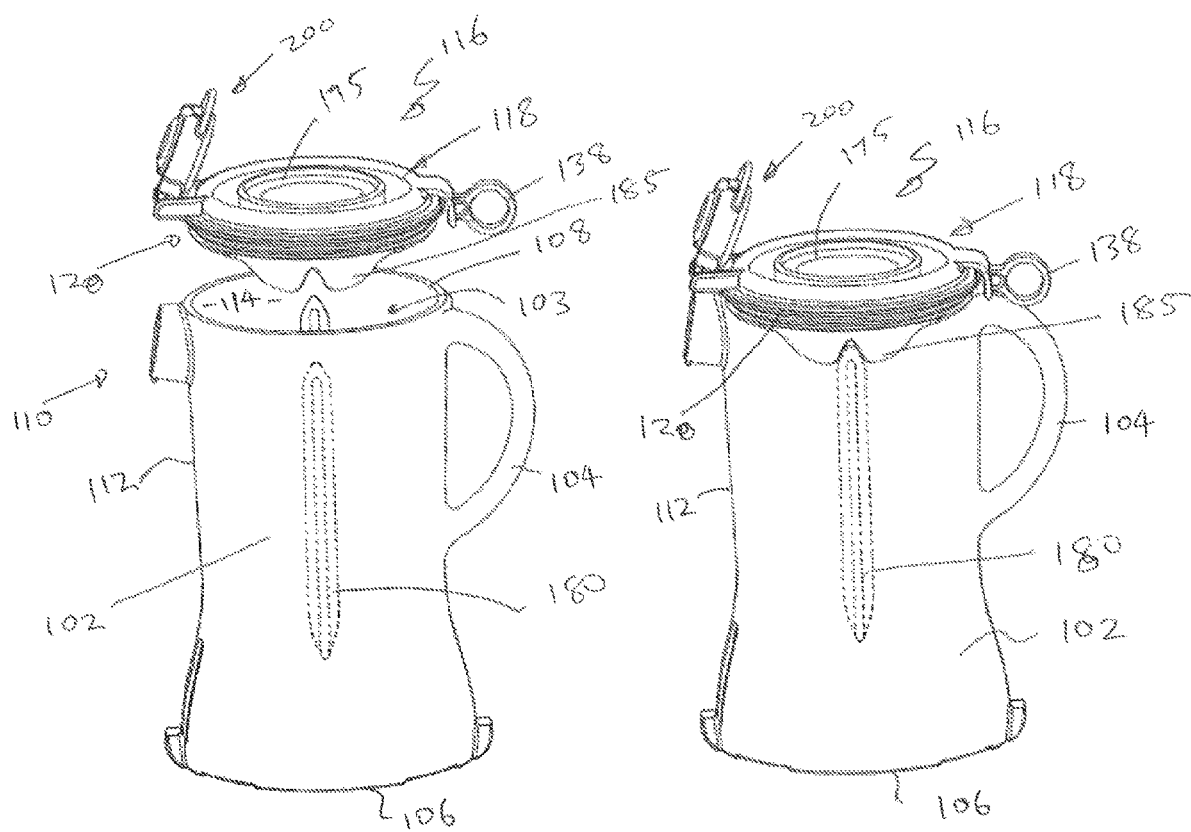
FIG. 5a is a perspective view of the blender jug, lid and lid cap of FIG. 4b with the lid spaced from the jug.
FIG. 5b is a further perspective view of the blender jug, lid and lid cap of FIG. 4b.

The body 102 has an upper rim portion 108 defining a top opening 114. The body 102 also has an interior 103 surrounded by a sidewall 112 (See FIG. 5a). A food product to be processed is delivered to the interior 103 where it is engaged by blades 173 of the blade assembly 172 or other apparatus that is motor driven by the drive assembly. As best seen in FIG. 5a, the sidewall 112 has a spout assembly 110 located adjacent the upper rim portion 108 providing a secondary access to and from the interior 103. As shown in FIG. 1, the spout assembly 110 is adapted to connect with various appliances to provide those appliances access to the interior 103.

Referring to FIGS. 10 and 11, the upper rim portion 108 terminates in a lip 109 which surrounds the top opening 114 that can be closed by means of a removable lid 116. The lid 116 includes a main part 118 and a skirt 120 as best depicted in FIGS. 5a and 5b. The main part 118 and the skirt 120 are preferably constructed of polymer material.

Figure 9:
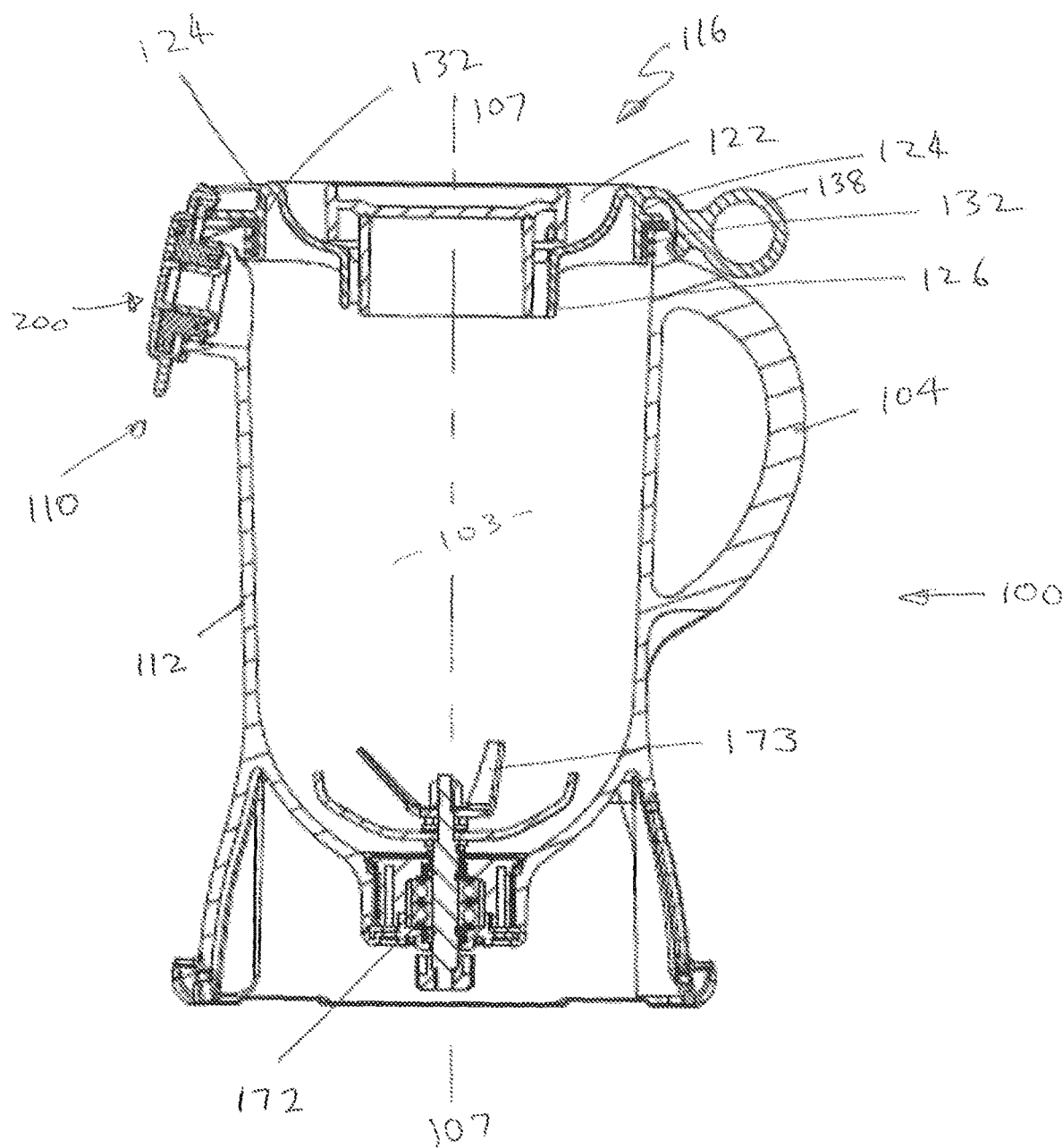
FIG. 9 is a sectioned side view of the jug, lid and lid cap of FIG. 3.
Figure 12A:
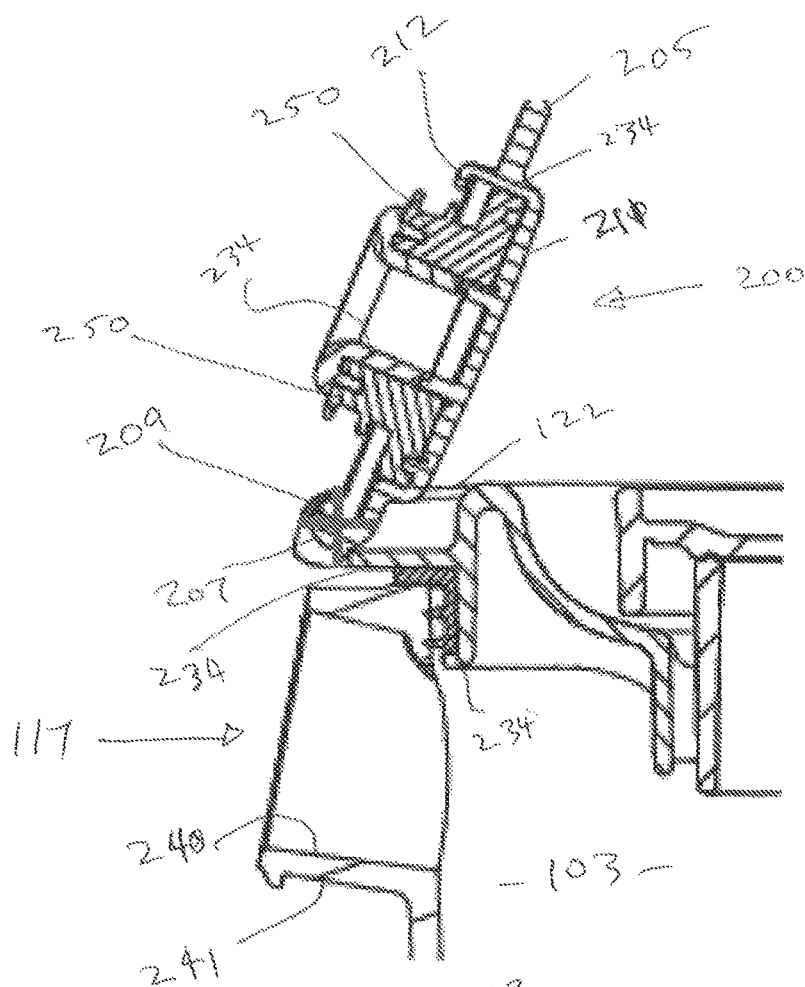
FIGS. 12a and 12b show sectioned views of the spout assembly with the spout open and closed.
Figure 12B:
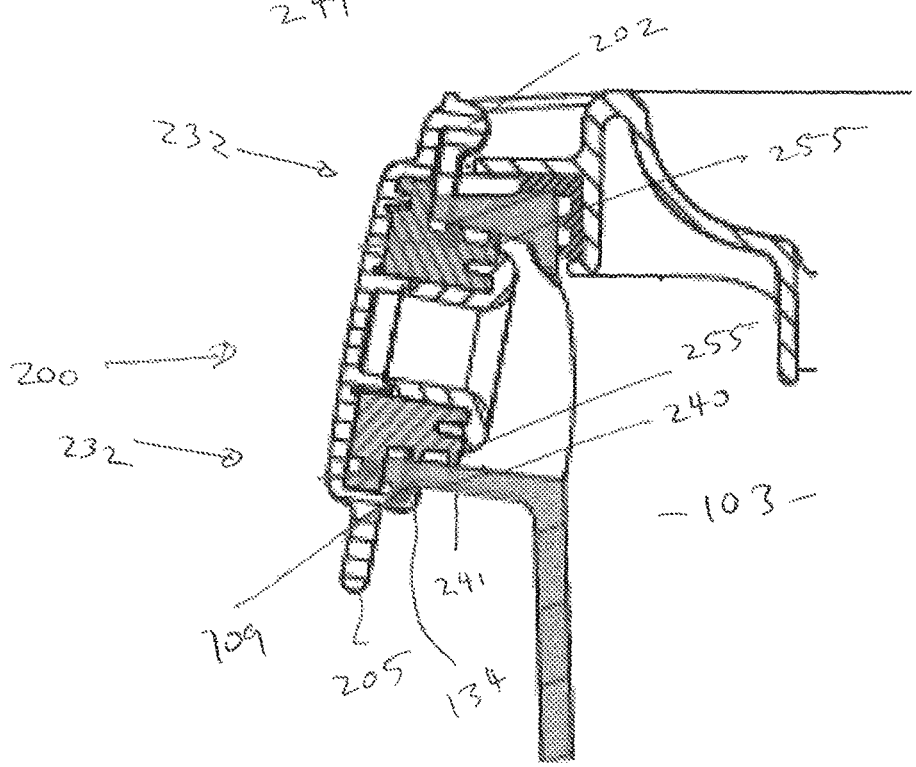

The main part 118 has a shape generally corresponding to opening 114 to at least substantially close the opening 114. The main part 118 includes a roof 122 having a flange 124 that extends from the periphery of the roof 122 and extends generally in a direction along the axis 107 to a floor 126 of the flange 124 (See. FIG. 9). The flange 124 is interrupted by one or more latch members 132 spaced apart around the roof 122. In the embodiment depicted, there are two opposing latch members 132 positioned about the upper rim portion 108.

As shown in FIG. 10, the latch members 132 are provided with protrusions in the form of ledges 134 extending transversely across an inner side surface of the latch members 132 proximal to the free hanging end of the latch members 132. When the main part 118 closes the opening 114, the ledges 134 locate under the lip 109 thereby latching the main part 118 to the rim portion 108 to securely close the opening 114.

The ledges 134 are configured to engage the underside of the lip 109 to resist positive pressure on the lid 116 that can be created within the body 102 (by certain liquid ingredients or when blending hot liquids, for example) but also to slidingly release from the lip 109 when encouraged.

In the embodiment depicted, one latch member 132 which is located on the edge of the roof 122 includes a pull ring 138, preferably integrally formed with an outer side of the latch member 132, extending outwardly away from the latch member 132. The pull ring 138 allows a user (by using a finger, for example) to leverage the latch member 132 away from the body 102 in a first direction and a subsequent second direction. The first direction is generally along a plane perpendicular to the axis 107 to release the latch member 132 from the lip 109. The second direction is generally parallel to the axis 107 to lift and rotate the lid 116 around a fulcrum located on the diagonally opposite edge on the periphery of the roof 122. This rotation imparts a force upon any other latch members 132 thereby changing their angle of engagement with the lip 109. As the rotation of the lid 116 increases, each ledge 134 of other latch members 132 are rotated relative to the underside of the lip 109 of the rim portion 108 encouraging the latch members 132 to flex and release the ledge 134 from the lip 109 to thereby remove the lid 116 from the body 102. It will be appreciated that the latch members 132 may flex independently of the roof 122.

The main part 118 may optionally include a central aperture 174 closable by a removable lid cap 175 which may be in the form of a measuring cup, for example. In alternative embodiments, the lid cap 175 may be replaced by a vacuum device (not shown) configured to hold a negative pressure within the body 102. The cap 175 can be used to release vacuum pressure when necessary.

As mentioned, the skirt 120 is generally shaped to complement the cross-sectional profile of the body 102. The skirt 120 and the main part 118 may be welded together using a process of induction welding. In this process, a thin metallic wire filament (ferrous) is enclosed within a trench located at the upper perimeter of the skirt 120. The skirt 120 and the main part 118, together with the filament, are placed within a magnetic field induced by a coil (not shown) with an electric current, whereby the field induces heat within the filament and causes both the main part 118 and the skirt 120 to be locally heated to melt temperature. The skirt 120 and the main part 118 are pressed together during this process and the locally melted polymer freezes to bond the skirt 120 and the main part 118 when the induction field is removed.

As seen in FIGS. 10 and 11, the skirt 120 is defined by sidewall 143 having an upper portion 144 and a lower portion 146. A seal 156 is located therebetween. The seal 156 is constructed of a polymer, preferably an elastomer, to flex against the sidewall 112 and/or rim 108.

The seal 156 has multiple flexible finger-like projections 158 extending around the periphery of the seal 156. The projections 158 sealingly interface with the sealing face of the sidewall 112 and/or the rim 108 of the body 102 to sealingly connect or engage the skirt 120 with the body 102 to prevent ingredients (liquid) being transferred from the interior 103 to the upper side of the projections 158 during a blending operation, for example. As shown in FIGS. 10 and 11, an upper projection 166 is configured to cooperate with the rim 108 so that when a vacuum is enacted within the interior 103 of the body 102, the upper projection 166 will deflect, thus increasing the interference and sealing force. That is, there is both an internal and external sealing of the container 100 (one inside the opening 114, and one outside the opening 114).

Figure 6:
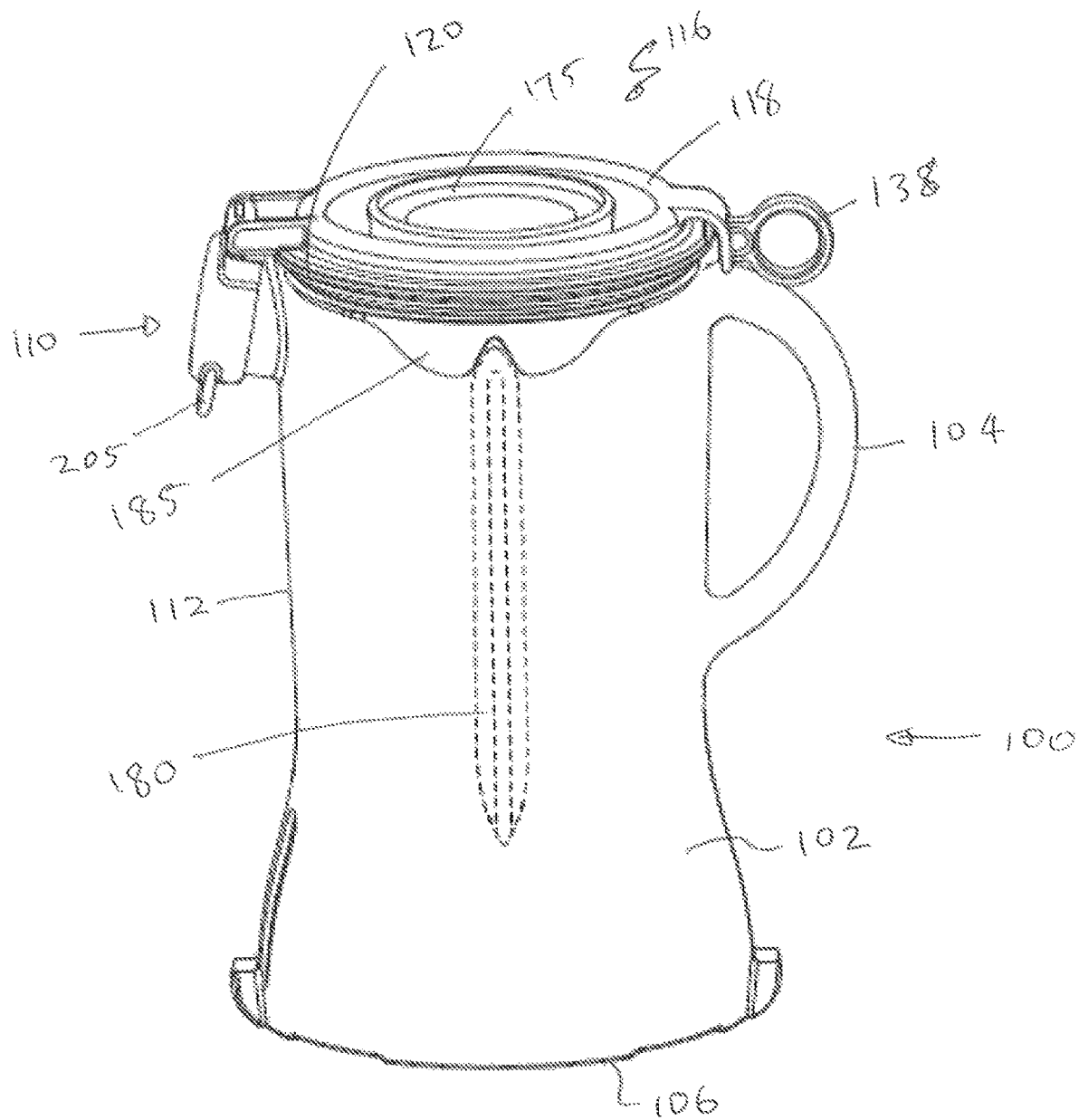
FIG. 6 is a further perspective view of jug, lid and lid cap of FIGS. 5a and 5b.

As shown in FIGS. 5a, 5b and 6, the container 100 and lid 116 include cooperating alignment/orientation features in the form of a ridge 180 extending away from the sidewall 112 into the interior 103 and longitudinally along the axis 107, and a corresponding guide 185 extending from the floor 126 of the lid 116. This cooperating arrangement may at least ensure that the lid 116 is placed in the correct orientation without having the user having to struggle to achieve proper alignment. That is, the guide 185 interacts with the ridge 180 to assist the user with aligning the lid 116 with the container 100.

As mentioned, the jug 100 includes a spout assembly 110 located integrally within the sidewall 112 adjacent the upper rim portion 108 providing a secondary access 117 (spout side opening) to and from the interior 103. By locating the spout 110 on the sidewall 112, the top of the container 100 is freed up to receive a vacuum device or other cooperating device (not shown).

Figure 7:
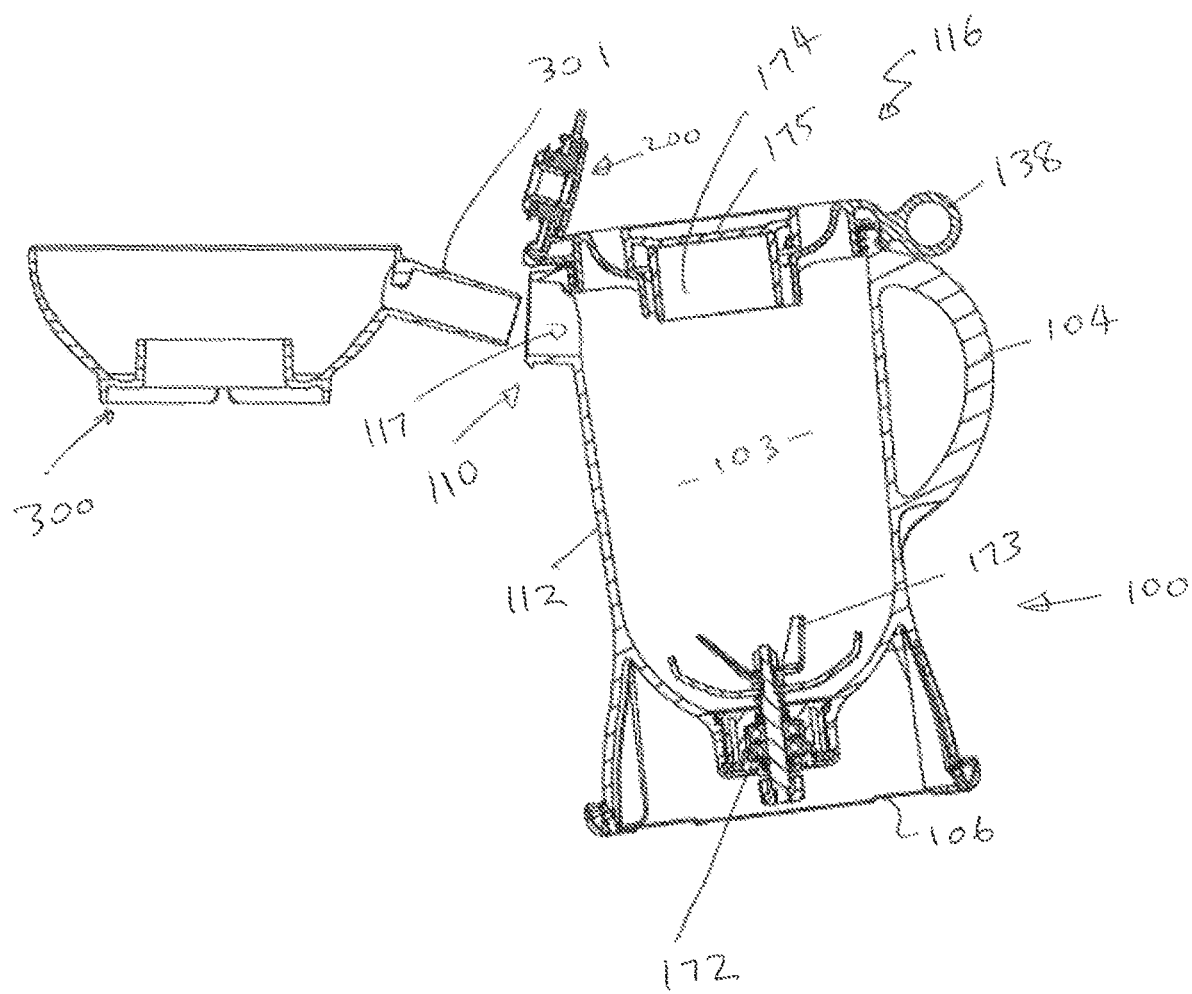
FIG. 7 is a sectioned side view of the jug, lid and lid cap of FIG. 3 prior to connection with a juicer spout.
Figure 8:
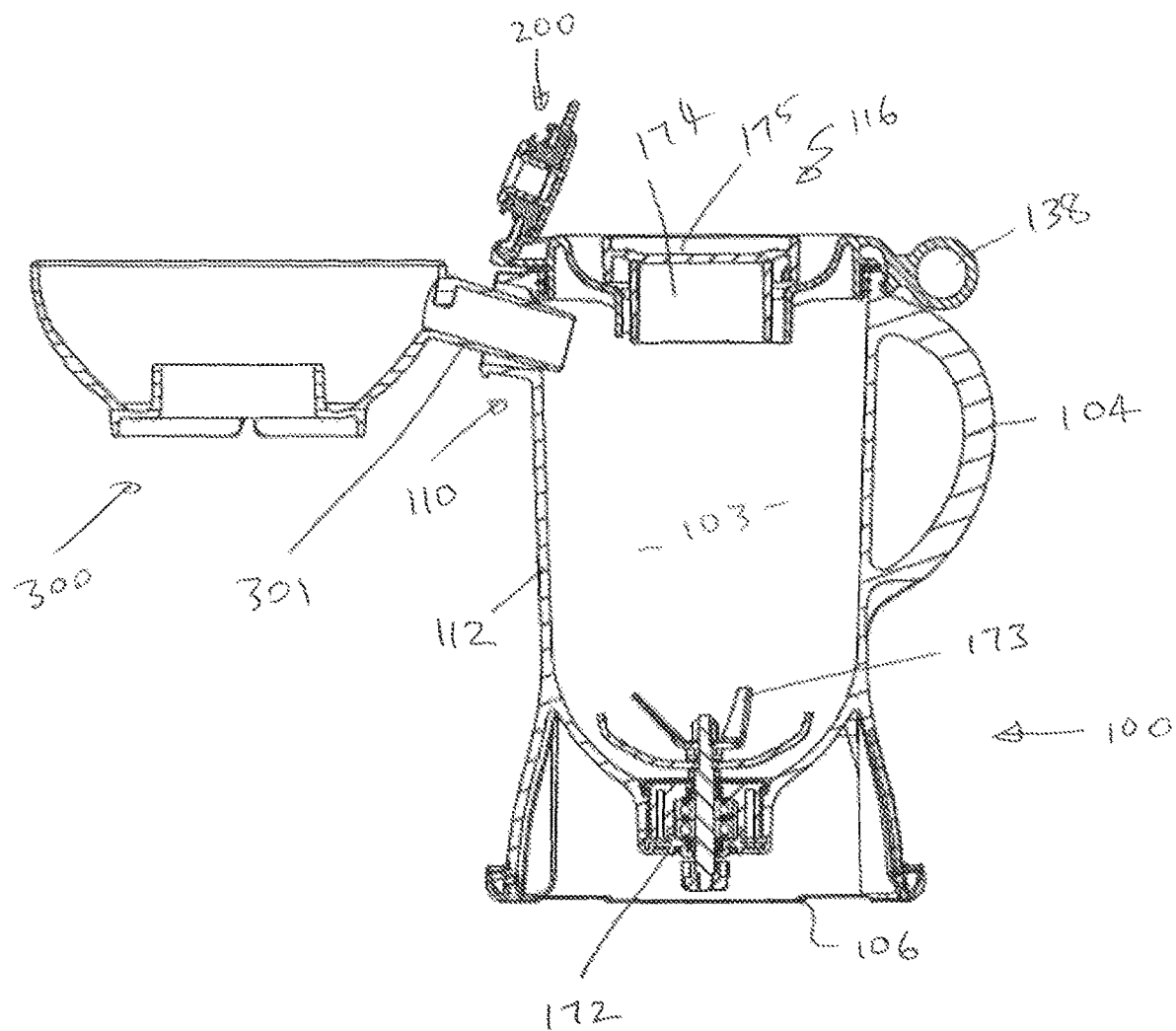
FIG. 8 is the sectioned side view of FIG. 7 with the jug, lid and lid cap connected with the juicer spout.

As best seen in FIGS. 7 and 8, the spout 110 is adapted to connect with various appliances (such as a juicer) to provide those appliances access to the interior 103. In FIGS. 7 and 8, a part of a juicer 300 is shown, and has an exit tube 301 that fits within the spout 110 to deliver juice to the interior 103. The container 100 can then be stored with the extracted juice and the spout 110 may be used to pour the juice from the container 100. FIG. 14 depicts a full jug 100, lid 116 and juicer 300 assembly, and will be described in further detail below.

Turning specifically to FIGS. 10, 11, 12a, and 12b, the spout assembly 110 includes a spout cover/sealing assembly 200. In the preferred form, the spout cover 200 is located on the lid 116. It may, however, be located on the container 100. The spout cover 200 has, at one end, a protrusion 202 locatable within a recess 207 on the lid roof 122, and is adapted in use to permit movement of the spout cover 200 about a pivot point 209 so that the spout cover 200 can pivot to open and close the spout 110 and secondary access 117. At the other end of the spout cover 200 is a clip 205 to ensure the spout 110 remains sealed during normal (non-vacuum) blending. When a vacuum is applied to the jug 100 before blending, the clip 205 is relieved of load as the vacuum pressure holds the lid 116 on the jug 100. The clip 205 operates in a similar way to ring 138 using a finger to help open/close the lid 116. Interestingly, however, the spout cover 200 may be closed, and the lid 116 opened from the ring 138 end, such that the spout 110 may act as a pivot. The clip 205 includes a ledge 134 that is lockable under a lip 109 as previously discussed and in this embodiment formed on the outside of the spout 110.

Figure 13B:
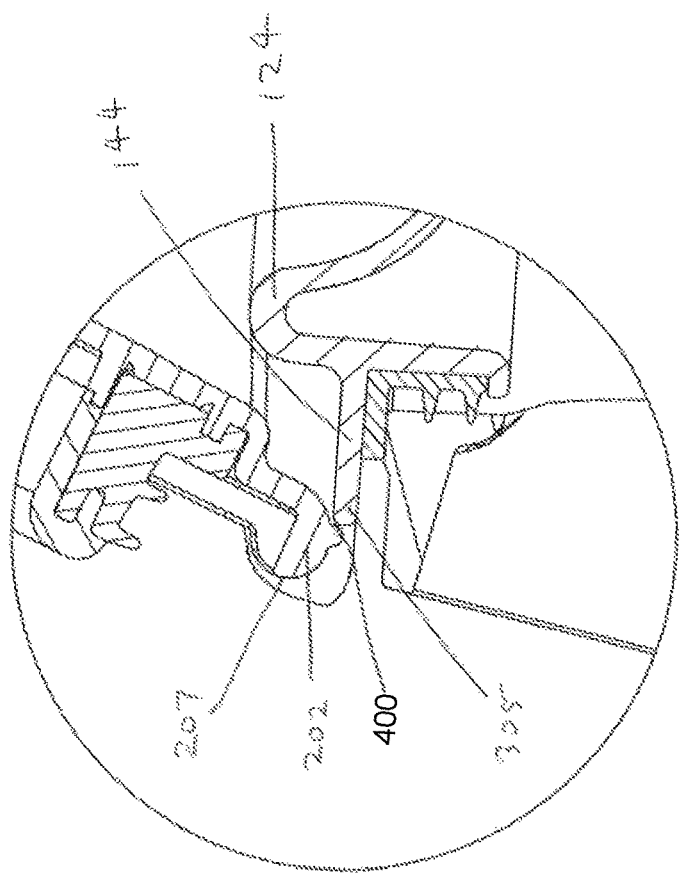
FIGS. 13a and 13b show exploded views of the notch feature.
Figure 13A:
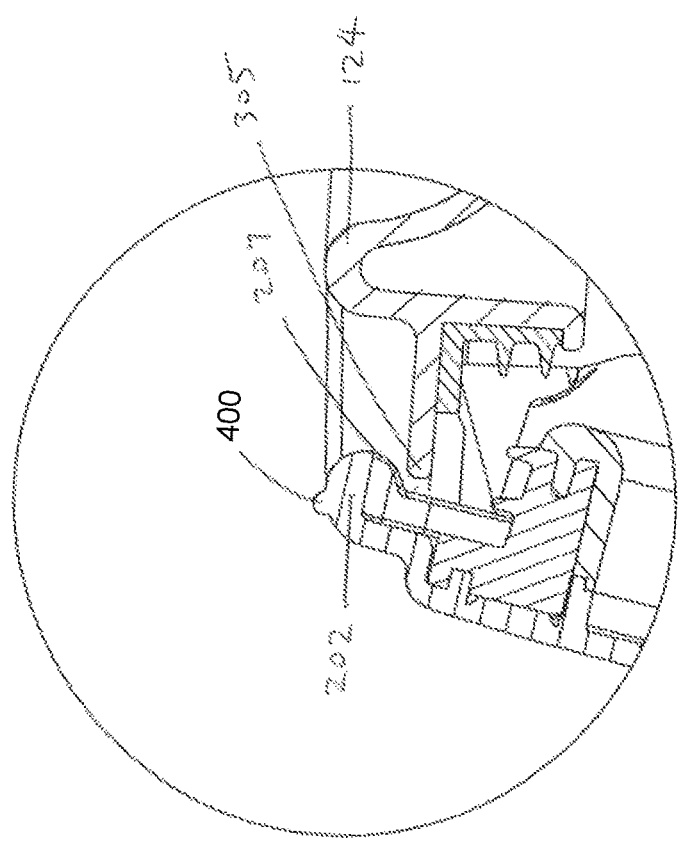

FIGS. 13a and 13b show detailed views of a notch or protrusion 400 and how it assists keeping the spout cover 200 open (FIG. 13b) so it does not fall into the closed position (FIG. 13a). The notch or protrusion 400 extends from the spout cover protrusion 202 which is rotatable within recess 207. The notch or protrusion 400 may be urged by a user past the end 305 of the upper portion 144 of the flange 124, to retain the spout cover 200 in an open configuration until positive force is applied by a user to close the spout cover 200.

The spout cover 200 includes an outer face 211 and an inner face 212. In the embodiment depicted, the inner face 212 includes two latch members 232 oppositely positioned and adapted to seal with either the inside 240 and outside 241 of the spout 110 (which protrudes away from the side wall 112 as mentioned above) and the secondary access 117. The latch members 232 are similar to those described above being provided with protrusions in the form of ledges 234 extending away from the outer face 211 to receive seals 250. The seals 250 includes a series of fingers 255 adapted to engage with both the inside 240 and outside surface 241 of the spout 110. That is, the seals 250 overlap the spout 110. The seals 250 will compress under vacuum against the container 100. The seals 250 resist ingredients coming out while blending, whilst still remaining relatively easy to open and close for the user. The seals 250 resist air from being pulled into the vessel through the secondary access spout 117. By resisting air access, an internal vacuum may be achieved. As mentioned above, as the vacuum pressure increases, the assembly pulls the seals 250 down harder.

As discussed above, the spout assembly 110 of the jug 100 is adapted to connect with various appliances (such as a juicer) to provide those appliances access to the interior 103 of the jug body 102. FIG. 14 shows a full assembly of the jug 100 (hereinafter the blender jug 100) with the lid 116, and a juicer apparatus 300. The juicer apparatus 300 as depicted includes, amongst other things, a motorised base 405 comprising the drive motor power housing 174 described above, a juicer chamber 410 surrounded by a chamber housing 412, a filter basket 415 having a grating disc 417, and a feed tube 420. The filter basket 415 is located within the juicer chamber 410 and is rotatable by an output shaft of the motorised base 405. The juicer chamber 410 has the exit tube 301 as described above, which fits within the spout assembly 110 so as to provide a connection between the juicer chamber 410 and the interior 103 of the blender jug 100. A food item to be juiced (e.g. a piece of fruit) is inserted into the feed tube 420 at the top of the juicer apparatus 300, and subsequently contacts the grating disc 417. Operation of the juicer apparatus 300 enables rotation of the output shaft of the motorised base 405, which subsequently rotates the filter basket 415 and/or the grating disc 417 to juice the piece of fruit. The juice product is delivered from the juicer chamber 410, through the exit tube 301, and into the interior 103 of the blender jug 100.

The blender jug 100 may subsequently be transported or stored with the extracted juice, and the spout assembly 110 may be used to pour the juice from the blender jug 100. The spout assembly 110 may alternatively be disconnected from the exit tube 301 of the juicer chamber 410, so as to disconnect the blender jug 100 from the juicer apparatus 300. The juicer apparatus 300 may then be removed from the motorised base 405 and replaced with the blender jug 100. It will be thus appreciated that the motorised base 405 is a single motorised base that can accept both the blender jug 100 and the juicer apparatus 300 interchangeably and selectively. As such, the blender jug 100 may be placed on the same motorised base 405 (in a like manner to the juicer apparatus 300), and connected for a blending operation. In this way, the ability of the full assembly to function as a blender and juicer combination may be realised, with the blender jug 100 being capable of receiving contents from a juicing operation of the juicer apparatus 300, and subsequently being used for a blending operation without the need to transfer or pour the contents to a separate container or apparatus.

It will be appreciated that the blender jug 100 and the lid 116 of the full assembly may include substantially similar features as described above, with some of the relevant features repeated below for completeness. The blender jug 100 includes the hollow body 102 having the sidewall 112 which surrounds the interior chamber 103 that receives product and within which the product is processed. The spout 110 extends from the sidewall 112 of the body 102 and is adapted to be connected to the exit tube 301 of the juicer chamber 410 in use. The spout 110 may be covered by the spout cover 200 located on the lid 116. The body 102 also includes the upper rim portion 108 surrounding the body top opening 114, whereby the upper rim portion 108 is located proximate to the exit tube 301 of the juicer chamber 410 in use. The upper rim portion 108 is also located proximate to an upper rim 422 of the filter basket 415 in use. In one form, the upper rim portion 108 is generally level with the upper rim 422 of the filter basket 415 in use. The spout 110 may also include one or more sealing members in the form of the clip 205, one or more latch members 232, and/or the seals 250 described above. These sealing members sealingly engage the spout 110 and seal the interior chamber 103 from an external environment surrounding the blender jug 100.

The upper rim portion 108 may include the lip 109 as described above, and the spout 110 includes the secondary access or spout side opening 117. The lid 116 may further include the main part 118 to cooperate with the lip 109 to close the body top opening 114. The lid 116 may also further includes a top skirt (corresponding to the skirt 120 described above) to extend into the interior 103 of the body 102 and to sealingly interface with the inner surface of the sidewall 112 and the upper rim portion 108. The lid 116 may further include the spout cover/sealing assembly 200 which is moveably attached to the main part 118 and cooperates with the spout 110 to close the spout side opening 117.

The main part 118 of the lid 116 may further include the roof 122 that extends over the skirt 120, whereby the roof 122 may include one or more of the latch members 132 spaced around the periphery of the roof 122 to releasably couple the lip 109 of the upper rim portion 108. The spout cover 200 may also include one or more of the latch members 232 described above, to releasably couple to the lip of the spout side opening 117.

FIG. 14 also depicts dimensions of the full assembly in a preferred form.

Height H1 depicts a distance between an upper rim 425 of the juicer chamber 410 and an internal portion 430 of the exit spout 301. This height H1 may be in a range of between about 25 to 35 mm, preferably between about 27 to 28 mm, and more preferably about 27.9 mm.

Height H2 depicts a distance between the upper rim 425 and an external portion 435 of the exit spout 301. This height H2 may be in a range of between about 40 to 50 mm, preferably between about 44 to 45 mm, and more preferably about 44.4 mm.

Height H3 depicts a distance between the upper rim 425 and a base portion 440 of the juicer chamber 410. This height H3 may be in a range of between about 65 to 75 mm, preferably between about 68 to 70 mm, and more preferably about 69 mm.

Length L1 depicts a length of the exit spout 301. This length L1 may be in a range of between about 55 to 60 mm, preferably between about 56 to 58 mm, and more preferably about 57.3 mm. The exit spout 301 may have an internal diameter in a range of between about 18 to 20 mm, and preferably about 19.3 mm. The exit spout 301 may also have an external diameter in a range of between about 19 to 21 mm, and preferably about 20.2 mm. The exit spout 301 may also extend at an angle of between about 15 to 20 degrees relative to the plane along which the upper rim 425 of the juicer chamber 410 extends. Preferably, this angle is about 17 degrees.

Height H4 depicts a distance between the upper rim portion 108 of the blender jug 110 and the inner surface 240 of the spout 110. This height H4 may be in a range of between about 35 to 40 mm, preferably about 37 mm.

Height H5 depicts a distance between the upper rim portion 108 of the blender jug 110 and a first base portion 450 (i.e. a portion facing the interior 103) of the blender jug 110. This height H5 may be in a range of between about 65 to 75 mm, preferably between about 68 to 70 mm, and more preferably about 69 mm.

Height H6 depicts a distance between the upper rim portion 108 of the blender jug 110 and a second base portion 455 (i.e. a portion facing the exterior of the full assembly, and in contact with the bench surface) of the blender jug 110. This height H6 may be in a range of between about 245 to 250 mm, and preferably about 247.2 mm.

It will be appreciated that the relative heights described above may at least allow the full assembly to be located at a reasonably low height compared to existing combination blender juicer appliances. In particular, in the depicted embodiment, the upper rim portion 108 of the blender jug 100 is generally proximate to the upper rim 425 of the juicer chamber 410 (and generally level with the upper rim 422 of the filter basket 415) in use. The exit spout 301 of the juicer chamber 410 and the spout assembly 110 of the blender jug 100 are also generally proximate to the upper rim portion 108 (and thereby the top opening 114) of the blender jug 100 in use. The relative arrangement of the upper rim portion 108 of the blender jug 100, the spout assembly 110 of the blender jug 100, the upper rim 422 of the filter basket 415, and the exit spout 301 of the juicer chamber 410, may at least allow a maximum fill height of the blender jug 100 to be achieved, and at the same time, minimising the overall height of the full assembly such that the full assembly may be used in kitchens with low hanging cupboards and limited bench space, for example.

The above preferred embodiments have a number of advantages including a lid 116 that can function as a standard blender type lid, and also operatively mate to a juicer apparatus 300 or the like, and provide a closed seal for vacuum application. There is provided a simple operation of juicing and vacuuming functions with minimal user interaction required. The interchangeability of the blender jug 100 and the juicer apparatus 300 (i.e. both operable by a single motorised base) may also provide for a more efficient and clean operation when both blending and juicing is required, whilst at the same time minimising the overall footprint of the full assembly.

A further advantage of the above described preferred embodiments is that they may allow juicing from the appliance 300 into a vessel 100 which can then be vacuum sealed. Vacuum sealing of juice preserves ingredients for longer by limiting the oxidation process.

A yet further advantage of the above described preferred embodiments is that they may provide a lid vessel assembly position for both juice ingress and vacuum modes. The juice can enter the vessel with the spout cover 200 open (See FIG. 8). The user closes the spout cover 200 (FIG. 9) and can then apply vacuum pressure to the vessel 100 without the need to move the lid or lid assembly to an open and closed positions.

A further advantage of the above described embodiments is that the spout 110 protrudes from the vessel side wall 112 and is able to be sealed for vacuum. That is, it is not captured to the lid and is not planar. The spout 110 may also be sealed in more than one plane.

Although the invention has been described with reference to specific examples, it will be appreciated by those skilled in the art that the invention may be embodied in many other forms.

The invention claimed is:

1. An assembly comprising a blender jug and a juicer apparatus,
the juicer apparatus including:
a motorised base;

a juicer chamber having an exit tube; and a filter basket located within the juicer chamber and rotatable by an output shaft of the motorised base;

the blender jug including:

a hollow body surrounding an interior chamber to receive product and within which the product is processed;

a spout extending from the hollow body and adapted to be connected to the exit tube of the juicer chamber in use, the spout being covered by a spout cover that is located on a lid of the blender jug; and wherein the body includes an upper rim portion surrounding a body top opening, whereby the upper rim portion is located proximate to the exit tube of the juicer chamber in use.

2. The assembly of claim 1, wherein the upper rim portion of the body is located proximate to an upper rim of the filter basket.

3. The assembly of claim 2, wherein the upper rim portion is generally level with the upper rim of the filter basket.

4. The assembly of claim 1, wherein the spout cover includes one or more sealing members to sealingly engage the spout and seal the interior chamber from an external environment surrounding the blender jug.

5. The assembly of claim 1, wherein the motorised base of the juicer apparatus is adapted to interchangeably receive the juicing apparatus and the blender jug for selective operation of the juicer apparatus and the blender jug.

6. The assembly of claim 1, further including the lid of the blender jug, and wherein:

the body of the blender jug includes a sidewall, and the spout extends from the sidewall adjacent the upper rim portion, and wherein the upper rim portion includes a lip and the spout includes a spout side opening.

7. A lid for a food processor, the food processor including a hollow body providing an interior chamber to receive product and within which the product is processed, the body having a sidewall with a rim portion surrounding a body top opening, the rim portion having a lip, the body further including a spout protruding from the side wall adjacent the rim portion and having a spout side opening, the lid including:

a main part to cooperate with the lip to close the body top opening;

a top skirt to extend into the interior of the body and sealingly interface with an inner surface of the sidewall and the rim portion; and a cover moveably attached to the main part and to cooperate with the spout to close the spout side opening;

the cover having a side skirt to extend into the spout and sealingly interface with an inner and outer surface of the spout side opening, wherein the cover is pivotally connected to the main part, and wherein the cover includes a notch or protrusion cooperatively associated with a flange on said main part to retain the cover in an open position.

8. The lid of claim 7, wherein the main part includes a roof extending over the top skirt, the roof including at least one latch member spaced apart around a periphery of the roof to releasably couple to the lip of the rim portion.

9. The lid of claim 8, wherein the latch member can flex independently on the roof.

10. The lid of any one of claim 7, wherein the cover includes a latch member to releasably couple to a lip of the spout side opening.

11. The lid of claim 10, wherein the roof latch member and the cover latch member each include a projection to engage the lip to secure to the body.

12. The lid of claim 11, wherein at least one of the latch members includes a pull tab.

13. The lid of claim 11, wherein at least one of the latch members includes a clip.

14. The lid of any one of claim 11, wherein the latch members each have a sealing projection to engage the rim portion so that the sealing projection deflects into the inner surface of the sidewall to seal the body when the interior chamber is subjected to a negative pressure relative to outside the interior.

15. The lid of claim 14, wherein the sealing projections overlap the rim portion to provide sealing engagement inside and outside the interior chamber.

16. The lid of claim 14, wherein the sealing projections overlap an opening of the spout to provide sealing engagement inside and outside the spout side opening.

17. The lid of any one of claim 1, wherein the main part includes a guide adapted to cooperate with a corresponding ridge on the body to provide alignment of the main part and body.

18. In combination:

a container for a food processor, the container including a hollow body providing an interior chamber to receive product and within which the product is processed, the body having a sidewall with an outwardly stepped rim portion surrounding a body top opening, the rim portion having a lip, the body further including a spout protruding from the sidewall adjacent the rim portion and having a spout side opening; and a removable lid to close the container, the lid including:

a main part to cooperate with the lip to close the body top opening;

a top skirt to extend into the interior of the body and sealingly interface with an inner surface of the sidewall and the rim portion; and a cover moveably attached to the main part and to cooperate with the spout to close the spout side opening; and the cover having a side skirt to extend into the spout and sealingly interface with an inner and outer surface of the spout side opening so as to apply pressure thereto, wherein the cover, which is pivotally connected to the main part, also includes a notch or protrusion cooperatively associated with a flange on said main part to retain the cover in an open position.

* * * * *